March 4, 1952     J. J. GEESINK     2,588,229
HUB MOTOR WITH COUPLING

Filed March 22, 1950

Inventor,
Jacobus J. Geesink,
by Hall & Houghton
Attorneys.

Patented Mar. 4, 1952

2,588,229

UNITED STATES PATENT OFFICE 2,588,229

HUB MOTOR WITH COUPLING

Jacobus Johannes Geesink, Bussum, Netherlands, assignor to Speedwheel N. V., Amsterdam, Netherlands, a company of the Netherlands Application March 22, 1950, Serial No. 151,081
In the Netherlands March 23, 1949

7 Claims. (Cl. 74—421)

The invention relates to a hub motor for a wheel of a bicycle or similar vehicle, the motor being mounted on a stationary axle member of the hub and driving the hub via a toothed gearing and a coupling, the said toothed gearing and coupling being located inside the hub. A hub motor of this type is known from British patent specification No. 144,008. The coupling employed in this case is a slip coupling. This coupling can be operated from the outside. However, the very fact of its being a slip coupling renders the operating mechanism relatively complicated and vulnerable, which is inadmissible in the case of the said hub motors, which ought to be as simple as possible. Besides, owing to this mechanism the hub motor is not entirely closed and thus a feature of eminent importance is lost.

Hub motors are known in which no coupling is incorporated at all. This is inadmissible, because, for example, in the case of motor trouble, it should be possible to put the motor out of gear, so that the vehicle may be propelled without the motor. The presence of a slip coupling is desirable in order that, in the case of sudden braking of the vehicle or the motor, slip may be caused in the gearing and no fracture shall occur owing to the otherwise inevitable shock.

Now the invention is based on the conception that the required properties are obtained just as effectively by bringing about a functional separation of the two coupling actions, viz. slip and disconnectability (disengagement). This produces a simple and sound construction. According to the invention, the coupling is of a type that can be put in and out of gear and operates positively, combined with a slip coupling. A positively operating coupling that can be put out of gear can be constructed in a simple and reliable manner, also as regards the operating mechanism, and the closed construction of the hub motor need hardly be impaired by the presence of such an operating mechanism. On the other hand a non-operable slip coupling can also be very simple and even more reliable in operation than an operable slip coupling.

The drawing illustrates an embodiment of the invention.

Figure 1:
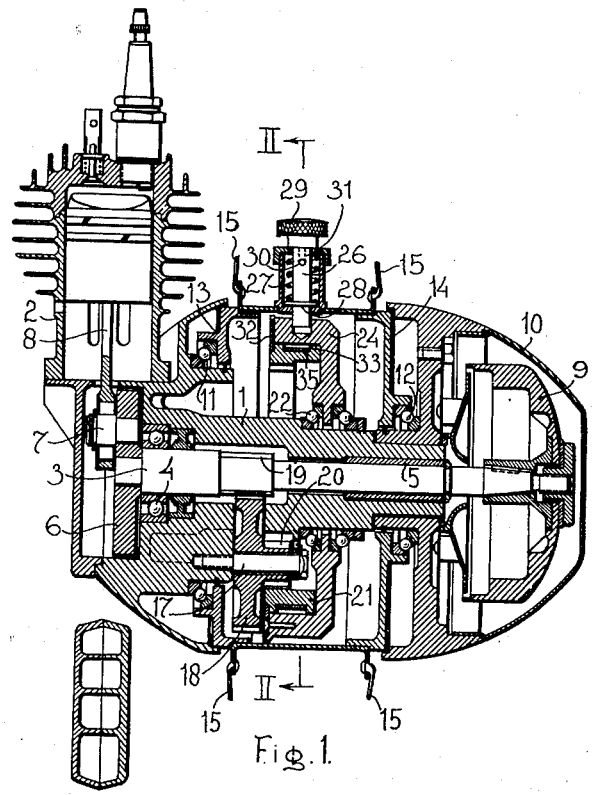
Fig. 1 is an axial cross-section through a hub motor according to the invention.

The stationary axle member in the construction is formed by the sleeve 1, on a flange of which the motor cylinder 2 is mounted. Inside the sleeve 1 is the crankshaft 3, supported at 4 in a ball bearing and at 5 in an ordinary bearing. At the lefthand end the crankshaft 3 carries the crank disc 6 with the crank 7, with which the connecting rod 8 engages. At the other end the crankshaft carries the flywheel with magneto 9, protected by the cover 10.

On the said stationary axle member 1 the flanges 13, 14 of the hub, to which the spokes 15 are fixed, are supported in two ball bearings 11 and 12.

The stationary axle member 1 also contains the shaft 17, on which the gear wheel 18 is rotatable, which engages the pinion teeth 19 of the crankshaft 3. The gear wheel 18 is connected to the pinion 20, which is in engagement with the toothed rim 21 with internal toothing.

Figure 2:
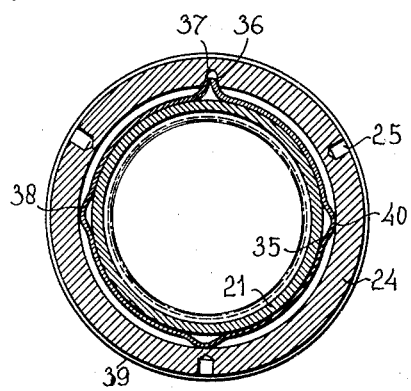
Fig. 2 is a cross-section through a part of the gear unit on the line II—II in Fig. 1.

The stationary axle member 1 further carries the rimmed coupling disc 24, rotatable in the double ball bearing 22 and clearly illustrated in cross-section in Fig. 2. At the circumference the disc is provided with three cavities 25, with which a pin 26, which is fixed in the hub between the spokes, can co-operate. This pin 26 is acted upon by a spring 27, which, by pressing against the collar 28, constantly tries to press the pin down, consequently into one of the cavities 25. If the pin 26 is pushed in, the disc 24 is firmly coupled to the hub. The pin 26 has a knob 29, by means of which it can be pulled out and kept in the pushed-out position by a slight turning movement, as a result of which the small pin 30 leaves the slot 31 and comes to rest beside the latter on the top of the casing of the pin 26. The coupling between the disc 24 and the hub is then interrupted, and the hub is no longer driven by the motor.

The toothed rim 21 is located inside the flange of the disc 24. It is rotatable therein and closed in axially by the ring plate 32. The toothed rim 21 has been provided with an annular groove 33 and inside it is a steel spring 35. This spring 35 has bent ends 36 located in a cavity 37 of the disc 24, so that the spring 35 cannot rotate. The spring 35 is slightly buckled at 38, 39 and 40, so that it both clings round the toothed rim 21 and against the flange of the disc 24. This spring 35 constitutes the frictional element, which in the case of overload may cause the toothed rim 21 to rotate in relation to the disc 24.

If required, the spring 35 can be replaced by or combined with braking material (leather, asbestos composition, cork), also other constructions of a slip coupling are conceivable.

What I claim is:

1. A hub-motor for a vehicle wheel comprising, in combination, a stationary supporting member, an internal combustion engine having a crankshaft supported by said member, a wheel hub rotatably supported by said member, a coupling element, releasable means for positively coupling said coupling element to and uncoupling it from said wheel hub, a gear train driven by said crankshaft, a slip clutch driven by said gear train, said slip clutch driving said coupling element.

2. A hub-motor according to claim 1, in which the coupling element comprises a drum freely rotatable concentrically with the hub, and in which the slip-clutch comprises an annular frictioning element within said drum and an annular clutch element within said frictioning element and driven by said gear train.

3. A hub motor according to claim 2 in which the stationary member on which the wheel hub is rotatably supported has a sleeve-like portion concentric with the wheel hub, and in which said coupling element is rotatably mounted on said sleeve-like portion.

4. A hub motor according to claim 3 in which said annular clutch element is an internally toothed ring gear terminating said gear train and is supported, with said frictioning element, by said coupling element.

5. A hub motor according to claim 2, in which the annular frictioning element comprises an annular spring with a radius varying in at least one sector to cause it to bear tightly against the adjacent walls of the annular clutch element and drum.

6. A hub motor according to claim 1 in which the releasable means comprises a cavity formed in the coupling element and a pin carried by the wheel hub and axially movable relative thereto to enter said cavity.

7. In a hub motor for a vehicle wheel, in combination, a wheel hub, a stationary supporting part including an axle member for the wheel hub and an internal combustion engine having a crankshaft rotatable within said axle member, a driving pinion on said crank shaft, a driven pinion driven thereby and rotatably mounted on said stationary part, a ring gear driven by said driven pinion, a slip clutch driven by said ring gear and comprising a power output member, and releasable means for positively coupling said power output member to said wheel hub.

JACOBUS JOHANNES GEESINK.

REFERENCES CITED

The following references are of record in the file of this patent:

UNITED STATES PATENTS

| Number | Name | Date |
|---|---|---|
| 633,014 | Lawson | Sept. 12, 1899 |
| 2,347,788 | Nardone | May 2, 1944 |
| 2,480,212 | Baines | Aug. 30, 1949 |

FOREIGN PATENTS

| Number | Country | Date |
|---|---|---|
| 165,925 | Germany | Dec. 2, 1905 |
| 107,504 | Germany | Nov. 1, 1924 |